(12) United States Patent
Evans et al.

(10) Patent No.: US 10,572,859 B1
(45) Date of Patent: Feb. 25, 2020

(54) SYSTEMS AND METHODS FOR INTELLIGENTLY JOINING A MEETING/CONFERENCE

(71) Applicant: Fuze, Inc., Boston, MA (US)

(72) Inventors: Aaron Evans, Ottawa (CA); Julio Viera, Pleasanton, CA (US); Lukasz Surazski, Boston, MA (US)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 16/248,226

(22) Filed: Jan. 15, 2019

(51) Int. Cl.
*H04M 3/56* (2006.01)
*G06Q 10/10* (2012.01)
*G06F 16/2457* (2019.01)
*H04W 68/00* (2009.01)
*H04M 3/42* (2006.01)
*G08B 5/36* (2006.01)

(52) U.S. Cl.
CPC ... *G06Q 10/1095* (2013.01); *G06F 16/24578* (2019.01); *G08B 5/36* (2013.01); *H04M 3/42068* (2013.01); *H04M 3/42365* (2013.01); *H04M 3/565* (2013.01); *H04W 68/005* (2013.01)

(58) Field of Classification Search
None
See application file for complete search history.

(56) References Cited

U.S. PATENT DOCUMENTS

| | | | |
|---|---|---|---|
| 7,353,251 B1 * | 4/2008 | Balakrishnan | H04L 12/1818 709/204 |
| 8,107,402 B1 * | 1/2012 | Everson | H04M 3/56 370/260 |
| 9,591,140 B1 * | 3/2017 | Carlson | H04M 3/56 |
| 2011/0154204 A1 * | 6/2011 | Narayanaswamy | H04M 3/56 715/727 |
| 2014/0177815 A1 * | 6/2014 | Bhow | H04L 12/1818 379/202.01 |

* cited by examiner

*Primary Examiner* — Harry S Hong
(74) *Attorney, Agent, or Firm* — McDermott Will Emery LLP (57) ABSTRACT

Methods and systems for intelligently joining a conference are provided. The method includes initiating a connection for a user to an audio conferencing service, such as through an alert or notification. The method also includes matching the user with contact details including user's name, email address, phone number, user ID, and/or enterprise. The method also includes determining a confidence score based on matching the user with the contact details to verify an identity of the user when the confidence score exceeds a predetermined threshold. The method also includes searching calendar data for a meeting involving the user based on the contact details of the user, the meeting being scheduled proximate to a current time, the calendar data having a scheduled start time and a scheduled end time for the meeting. The method also includes joining the user to the meeting via the audio conferencing service based on the calendar data.

20 Claims, 5 Drawing Sheets

SYSTEMS AND METHODS FOR INTELLIGENTLY JOINING A MEETING/CONFERENCE

TECHNICAL FIELD

The present disclosure generally relates to audio/video conferencing, and more specifically relates to intelligently joining a meeting/conference.

BACKGROUND

Conventional techniques for joining a conference call require a caller to perform several tasks, including entering conference identification numbers, entering registration codes, and/or identifying themselves via a series of audio prompts. These tasks are tedious, time-consuming, and are subject to errors by the caller. Additionally, there are situations where the caller has many meetings scheduled close together, and it becomes difficult to quickly locate the correct conference information and join in a timely manner. Although automated reminders may be sent to the caller, they do not take into account whether the caller is busy, unavailable, and/or is travelling.

SUMMARY

The present disclosure provides for systems and methods for intelligently joining a conference. According to one embodiment of the present disclosure, a computer-implemented method for intelligently joining a conference is provided. The method includes initiating a connection for a user to an audio conferencing service. The method also includes matching the user with contact details including at least one of name, email address, phone number, user ID, and/or enterprise of the user. The method also includes determining a confidence score based on matching the user with the contact details to verify an identity of the user when the confidence score exceeds a predetermined threshold. The method also includes searching calendar data for a meeting involving the user based on the contact details of the user, the meeting being scheduled proximate to a current time, the calendar data having a scheduled start time and a scheduled end time for the meeting. The method also includes joining the user to the meeting via the audio conferencing service based on the calendar data.

According to one embodiment of the present disclosure, a system is provided that includes means for storing instructions, and means for executing the stored instructions that, when executed by the means, causes the means to perform a method for intelligently joining a conference. The method includes initiating a connection for a user to an audio conferencing service. The method also includes matching the user with contact details including at least one of name, email address, phone number, user ID, and/or enterprise of the user. The method also includes determining a confidence score based on matching the user with the contact details to verify an identity of the user when the confidence score exceeds a predetermined threshold. The method also includes searching calendar data for a meeting involving the user based on the contact details of the user, the meeting being scheduled proximate to a current time, the calendar data having a scheduled start time and a scheduled end time for the meeting. The method also includes joining the user to the meeting via the audio conferencing service based on the calendar data.

According to one embodiment of the present disclosure, a system is provided for intelligently joining a conference including a memory storing sequence of instructions, and a processor configured to execute the sequence of instructions, which when executed, causes the processor to perform initiating a connection for a user to an audio conferencing service. The execution of the sequence of instructions also causes the processor to perform matching the user with contact details including at least one of name, email address, phone number, user ID, and/or enterprise of the user. The execution of the sequence of instructions also causes the processor to perform determining a confidence score based on matching the user with the contact details to verify an identity of the user when the confidence score exceeds a predetermined threshold. The execution of the sequence of instructions also causes the processor to perform searching calendar data for a meeting involving the user based on the contact details of the user, the meeting being scheduled proximate to a current time, the calendar data having a scheduled start time and a scheduled end time for the meeting. The execution of the sequence of instructions also causes the processor to perform joining the user to the meeting via the audio conferencing service based on the calendar data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not as restrictive.

General Overview

Participants who dial into a conference call via a public switched telephone network (PSTN) or enterprise users who join through a traditional handset connected to a UCaaS platform are required to perform several tasks, including entering conference identification numbers, entering registration codes, and/or identifying themselves via a series of audio prompts. These tasks are tedious, time-consuming, and are subject to errors by the participant. Additionally, there are situations where it becomes difficult to quickly locate the correct conference information and join in a timely manner, such as when several meetings are scheduled close together. Although automated reminders may notify the participant of the scheduled meetings, they do not take into account whether the participant is busy, unavailable, and/or is travelling. Therefore, there is a need for intelligently joining a meeting/conference that overcomes these deficiencies.

Aspects of the present disclosure address these deficiencies by providing for a streamlined process that allows participants to join a meeting/conference. The streamlined process includes intelligently discovering the participant's identity based on dial-in information of the participant, predicting the meeting/conference they intend to join, and connecting them directly into the meeting/conference without any prompts.

Additional aspects of the present disclosure may leverage a calendar service of a UCaaS or other conferencing services to provide the ability to integrate with a calendar system of a productivity suite (e.g., GOOGLE DOCS or MICROSOFT OFFICE 365). The calendar service may include a meeting reminder service that triggers an end-user notification within the UCaaS software (e.g., a pop-up alert) when a meeting/conference is about to start.

According to aspects, an enterprise user may not have access to their computer, such as when the user is driving in a car, walking down the street, etc. In response to these situations, the meeting reminder service may utilize presence, calendar, and/or location data to determine a best mode for notifying the user about a meeting that is about to start and streamline their ability to join. Once contacted, the user may be presented with a simple accept/reject option to join the meeting/conference. For example a UCaaS platform may determine that the user is currently driving and so calls them via their mobile cellular connection.

According to aspects of the present disclosure, enterprise users may join a scheduled meeting by tapping a single button or softkey on a handset connected to a UCaaS platform. According to additional aspects, the streamlined process may include software components and algorithms embedded within a UCaaS platform that supports conferencing and/or collaboration services, physical audio endpoints such as voice over internet protocol (VoIP) handsets, and specialized conferencing hardware.

The disclosed system addresses a problem in traditional UCaaS platforms, namely the technical problem of streamlining the process of joining a meeting/conference from a PSTN or a traditional handset. As described above, conventional conferencing techniques are tedious, time-consuming, and subject to errors by the participant. The disclosed system solves this technical problem by providing a solution also rooted in computer technology, namely, by providing for a streamlined and optimized process for intelligently joining a meeting/conference.

The disclosed subject technology further provides improvements to the functioning of the computer itself because it improves the ability of the computer to connect to meeting/conferences and reduces the cost of resources for verifying participants. Specifically, joining a meeting/conference is simplified and optimized to improve user experience. This overcomes shortcomings associated with current solutions, which involve greater system resources.

As used herein, the term "interactive voice response (IVR)/call flow service" refers generally to an internet protocol (IP) private branch exchange (PBX) or similar service capable of supporting IVR or call flows. The IVR/call flow service may prompt a user for a meeting number, confirmation number, etc. and may be integrated with other components in the disclosed systems.

As used herein, the term "audio conferencing service" refers generally to where an audio component of a meeting/conference/collaboration session is hosted and the media of all participants is mixed. It may be the same service as the IVR/call flow service or a different component.

As used herein, the term "meetings/collaboration service" refers generally to one or more services that work in concert with the audio conferencing service to provide video and/or screen share capabilities for a collaboration/meeting experience. This service may also track how audio legs of the audio conferencing service correspond to video/collaboration sessions.

As used herein, the term "calendar service" refers generally to a service that is responsible for managing the scheduling of meetings/conferences/collaboration sessions. It may be a calendar/scheduling component internal to a meeting service, some other component of a UCaaS platform, or an adapter service that integrates with a third party calendar service, such as those from the Google and Microsoft productivity suites. Either directly or through an adapter service, it also may provide for the ability of an application program interface (API) client to subscribe to events related to a scheduled meeting, such as scheduled meeting time reached, scheduled end time reached, etc. Events may be in the form of a push notification that includes an identifier for a specific calendar item, an owner, start and end times, etc.

As used herein, the term "meeting reminder service" refers generally to a service that is responsible for triggering reminders/notifications to end-users for upcoming meetings. It may work in conjunction with the calendar service.

As used herein, the term "direct inward dialing number (DID) lookup/contact database service" refers generally to a lookup service capable of searching for contact information (e.g., name, company, etc.) based on a DID (e.g., phone number) of a caller. It may take a variety of forms such as, including but not limited to, white pages, an enterprise customer relationship management (CRM), etc. It may also be an adapter or aggregator to multiple services that may return search results. It may also resolve email addresses and/or full names based on caller ID information.

As used herein, the term "enterprise user directory" refers generally to a lookup service of all UCaaS enterprise users that may be searched by associated endpoint identifiers (e.g., session initiation protocol (SIP) credentials). It may be the same service as a DID/contact service or a separate service.

As used herein, the term "presence service" refers generally to a component of a UCaaS platform that may track user state information such as presence states explicitly set by the user (e.g., available, busy, do not disturb (DND), unavailable, etc.) in UCaaS endpoint/collaboration software, presence states triggered by UCaaS platform usage (e.g., in a meeting, on a call, etc.). It may also track a user state through calendar information (e.g., user is a participant in a scheduled meeting, business/working hours, etc.), and user location based on recent activity on specific endpoints, which may be associated with specific physical locations based on IP address and/or e911 registration, as well as GPS data from mobile endpoints. It may also detect that the user is in a moving vehicle and/or driving based on information gathered by a mobile endpoint.

As used herein, the term "collaboration software" refers generally to end-user software that may be used as part of a meeting/collaboration experience for providing one or more of audio, video, screen share, etc. The software may be installed on a mobile device, may be web based, or may be software installed on a user's workstation. The collaboration software may or may not handle audio legs for a collaboration session, because the audio may be be via dial in or through calling the user.

As used herein, the term "handsets" refers generally to UCaaS physical handsets or conferencing hardware connected to a UCaaS platform that may be utilized by audio participants. Handsets may also be utilized for handling audio of a user in conjunction with collaboration software.

Example System for Connecting a PSTN Caller

Figure 1:
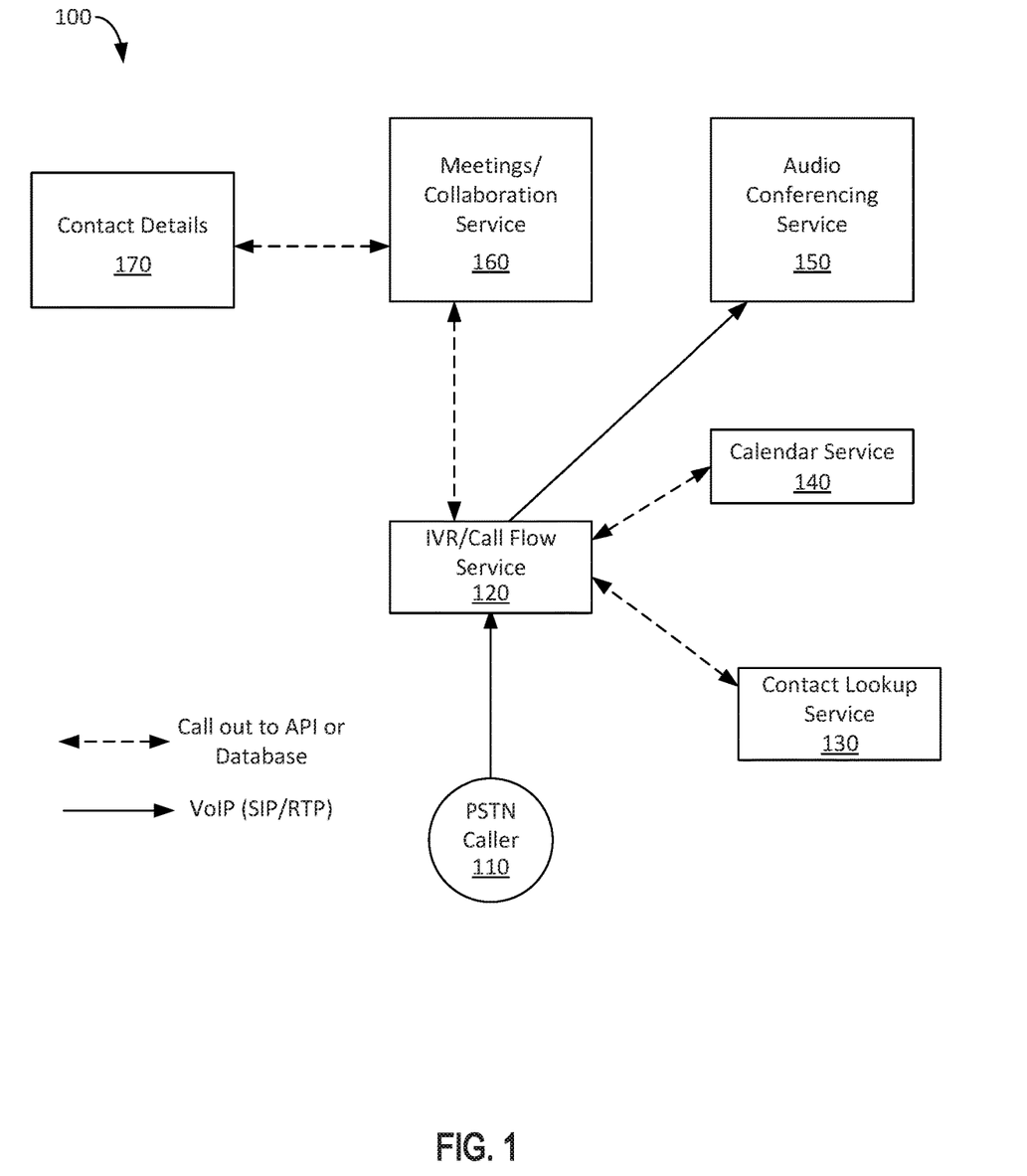
FIG. 1 illustrates an example system for connecting a public switched telephone network (PSTN) caller to a meeting/conference, according to certain aspects of the disclosure.

FIG. 1 illustrates an example system 100 for connecting a caller 110 (e.g., a PSTN caller) to a meeting/conference, according to certain aspects of the disclosure. The PSTN caller 110 (e.g., an external participant or enterprise user calling from off-net) may call a direct inward dialing number (DID) dedicated for the purpose of joining the caller 110 to a meetings/collaboration service 160 (e.g., a UCaaS/conferencing platform) for the meeting/conference.

According to an aspect, the PSTN caller 110 dials into an IVR/call flow service 120. For example, the caller 110 may dial in through VoIP (SIP/RTP), or other similar means. The IVR/call flow service 120 handling the inbound call may make an API call to a contact lookup service 130 (e.g., DID lookup/contact database service), passing in caller ID information of the caller 110 (e.g., name, number, etc.).

The contact lookup service 130 may search for contacts based on the caller ID information and may return the best possible match (if any) with contact details 170 such as name, email address, phone number, user ID, and tenant/enterprise ID (e.g., for an enterprise or registered user), as well as a confidence score (e.g., percent confidence for the match).

If a match is returned and the confidence score exceeds a preconfigured threshold (e.g., at least greater than 50%), the caller 110 is considered recognized. If the caller 110 is not considered recognized, the IVR/call flow service 120 may revert back to base programming and may prompt the caller 110 for a meeting number/ID and optionally to identify themselves.

If the caller 110 is considered recognized, the IVR/call flow service 120 records contact data and passes the contact data to the meetings/collaboration service 160 when the caller 110 ultimately joins a meeting as a participant. The contact data may include a contact type of the user (e.g., a user or a contact), origin (e.g., a string that identifies the database, service or platform where the recognized caller 110 was identified, such as a custom CRM system, SalesForce, or the UCaaS platform itself), and a contact identifier (e.g., a key that uniquely identifies the contact in the source system). It is understood that these are exemplary only, and other contact data may also be included.

The IVR/call flow service 120 may also call a calendar service 140 with the contact details 170 of the caller 110. The calendar service 140 may search calendar data for possible matching conference/collaboration meetings according to several criteria. The criteria may include determining scheduled start/end times, such that the current time is between a preconfigured number of minutes before the scheduled start time and the scheduled end time. The criteria may also include determining whether a list of participants contains the recognized caller. The criteria may also include determining whether the recognized caller is a registered user with the UCaaS platform. If so, then the scope of the search may be reduced to calendars of users under a specific tenant and the recognized user's calendar is given priority in being searched first. The search results are returned to the IVR/call flow service 120.

If a single match is found, the caller's audio leg is put directly into an audio conferencing service 150, bypassing the need for the caller 110 to enter a meeting number/ID. If no match is found, the caller 110 is prompted for a meeting number/ID. Upon entering a valid number/ID, the caller's audio leg is put into conference.

The recognized contact data may be supplied to the meetings/collaboration service 160 along with a unique identifier of the associated participant's audio leg. The meetings/collaboration service 160 looks up the contact details 170 based on the recognized contact and displays the contact details 170 within software of the meetings/collaboration service 160 used by any of the participants of the meeting.

Example System for Connecting Enterprise Users

Figure 2:
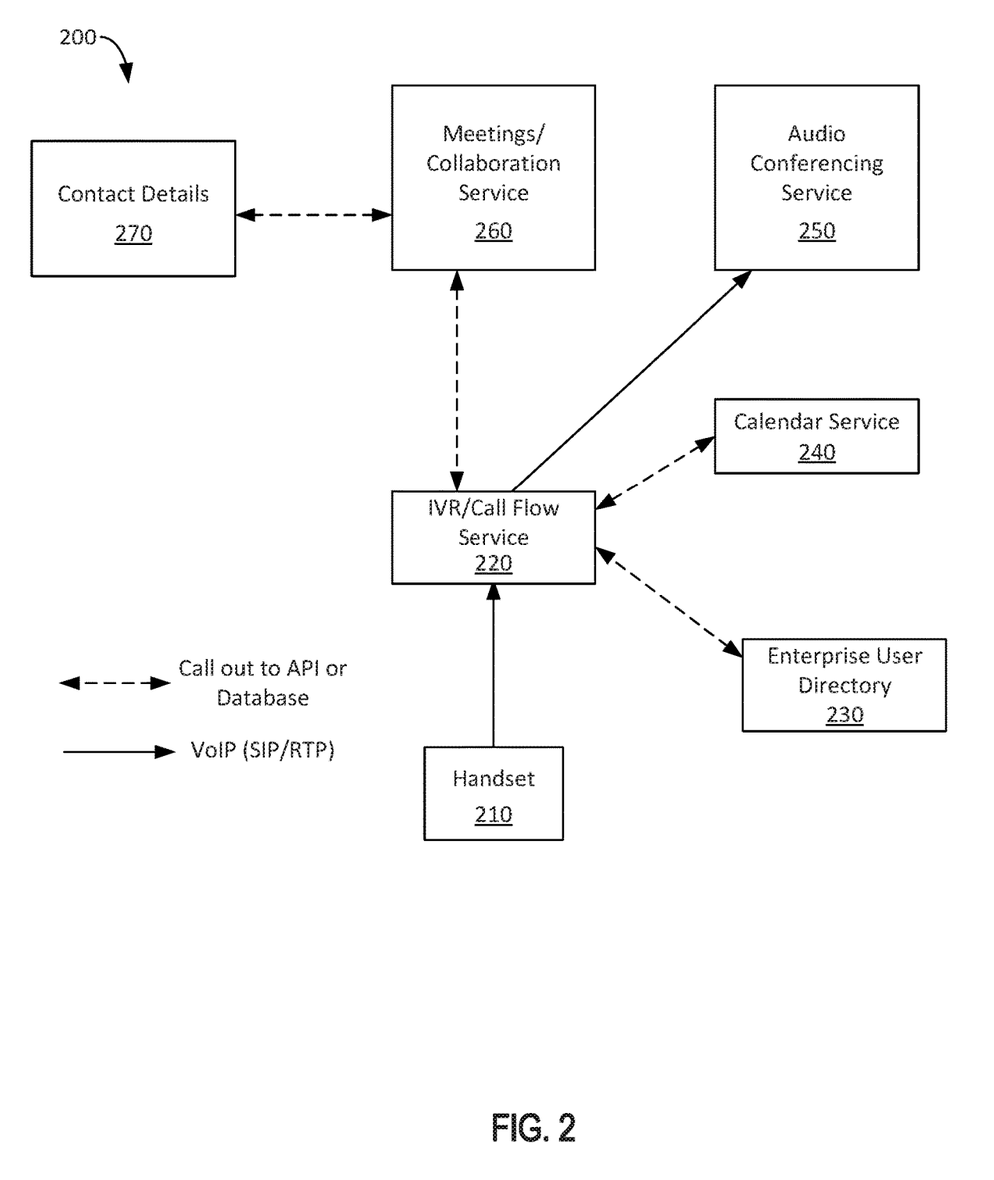
FIG. 2 illustrates an example system for connecting enterprise users to a meeting/conference, according to certain aspects of the disclosure.

FIG. 2 illustrates an example system 200 for connecting enterprise users to a meeting/conference, according to certain aspects of the disclosure. For example, an enterprise user may utilize a handset 210 for dialing into the meeting/conference. The handset 210 may be configured with a speed dial or softkey. Toggling the speed dial/softkey may initiate a call to a special extension or SIP URI.

According to an aspect, toggling the speed dial/softkey may connect the handset 210 to an IVR/call flow service 220, which makes an API call to an enterprise user directory 230 (e.g., a lookup service), which is capable of resolving an UCaaS enterprise user contact based on an authenticated SIP account of the caller.

The enterprise user directory 230 searches for the user associated with the given SIP account (if any) and returns contact details such as name, email address, phone number, user ID, and tenant/enterprise ID, as well as a confidence score (e.g., percent confidence for the match).

If a match is returned and the confidence score exceeds a preconfigured threshold (e.g., at least greater than 50%), the caller from the handset 210 is considered recognized. If the caller is not considered recognized, the IVR/call flow service 220 may revert back to base programming and may prompt the handset 210 for a meeting number/ID and optionally for the caller to identify themselves.

If the caller is considered recognized, the IVR/call flow service 220 records contact data and passes the contact data to the meetings/collaboration service 260 when the caller ultimately joins a meeting as a participant. The contact data may include a contact type of the user (e.g., a user or a contact), origin (e.g., a string that identifies the database, service or platform where the recognized caller was identified, such as a custom CRM system, SalesForce, or the UCaaS platform itself), and a contact identifier (e.g., a key that uniquely identifies the contact in the source system). It is understood that these are exemplary only, and other contact data may also be included.

The IVR/call flow service 220 may also call a calendar service 240 with the contact details 270 of the caller. The calendar service 240 may search calendar data for possible matching conference/collaboration meetings according to several criteria. The criteria may include determining scheduled start/end times, such that the current time is between a preconfigured number of minutes before the scheduled start time and the scheduled end time. The criteria may also include determining whether a list of participants contains the recognized caller. The criteria may also include determining whether the recognized caller is a registered user with the UCaaS platform. If so, then the scope of the search may be reduced to calendars of users under a specific tenant and the recognized user's calendar is given priority in being searched first. The search results are returned to the IVR/call flow service 220.

If a single match is found, the caller's audio leg is put directly into an audio conferencing service 250, bypassing the need for the caller to enter a meeting number/ID. If no match is found, the caller is prompted for a meeting number/ID. Upon entering a valid number/ID, the caller's audio leg is put into conference.

The recognized contact data may be supplied to the meetings/collaboration service 260 along with a unique identifier of the associated participant's audio leg. The meetings/collaboration service 260 looks up the contact details 270 based on the recognized contact and displays the contact details 270 within software of the meetings/collaboration service 260 used by any of the participants of the meeting.

According to additional aspects, the softkey may be different colors depending on a connection status of the handset 210. For example, the softkey may be shown as green on the handset 210 when no meeting are currently scheduled. While the softkey is green, a caller may toggle the softkey to join a meeting the conventional way (e.g., entering meeting ID, caller ID, etc.). The softkey may be shown as yellow on the handset 210 when a meeting is currently scheduled, and no other participants have joined. The softkey may be shown as red on the handset 210 when a meeting is currently scheduled, and other participants have already joined.

Figure 3:
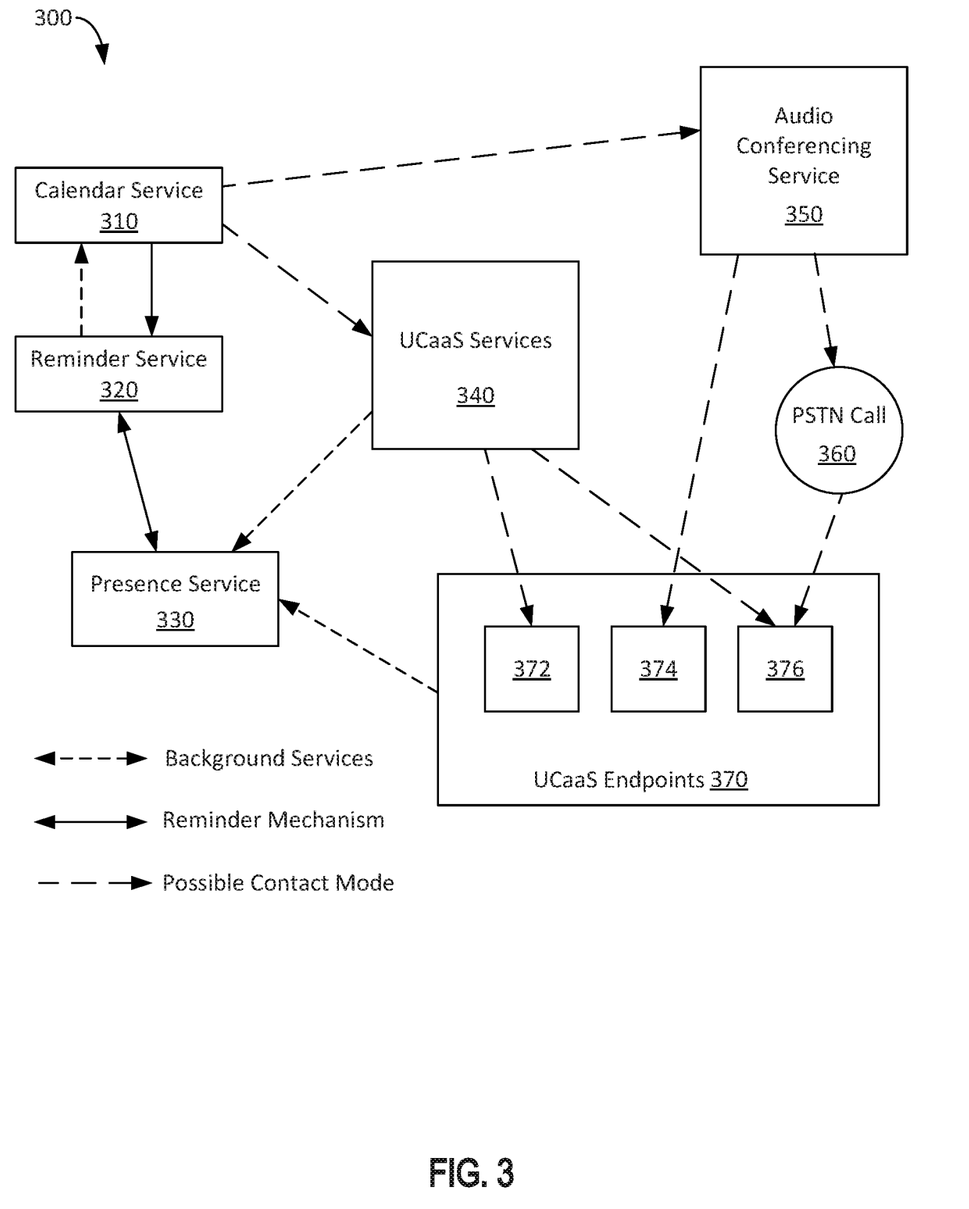
FIG. 3 illustrates an example system for automatically connecting enterprise users to a meeting/conference based on a detected unified communications as a service (UCaaS) endpoint, according to certain aspects of the disclosure.

Example System for Connecting Enterprise Users Based on a Detected UCaaS Endpoint FIG. 3 illustrates an example system 300 for automatically connecting enterprise users to a meeting/conference based on a detected UCaaS endpoint, according to certain aspects of the disclosure.

A reminder service 320 (e.g., a meeting reminder service) subscribes to meeting calendar events from a calendar service 310 on behalf of users and processes them in real-time. Enterprise users may concurrently be connected to a UCaaS platform from a variety of endpoints, such as mobile software, desktop software (e.g., whether or not via a browser), and physical handsets.

Upon receipt of an event indicating the enterprise user's meeting is about to start, the reminder service 320 retrieves user state information from a presence service 330 and intelligently chooses a mode to contact/notify the user about the meeting. The mode may include at least two components, including which endpoints 370 (e.g., UCaaS endpoints) to target (e.g., desktop 372, handset 374, mobile 376) and what channel to use (e.g., notification, chat, blinking light on handset, voice call). Notifications/calls may occur via existing UCaaS platform services. For example, UCaaS services 340, an audio conferencing service 350, and/or a PSTN call 360 may be utilized to notify the user of the meeting.

Specific business rules governing what mode should be used and under what conditions may be configurable as system defaults and may also be customized by enterprise administrators and/or end-users. Example business rules include doing nothing if the user is already connected to the meeting, doing nothing if the user's status is DND, calling the mobile 376 directly and prompting the user with a simple yes/no to join the meeting if driving is detected, and calling handset 374 directly with a simple yes/no prompt to join the meeting if the user is offline in desktop 372 and/or mobile 376.

According to aspects, a notification may be sent to endpoints 370 that were used/active within a predetermined period (e.g., the last five minutes). For example, the handset 374 may display a blinking light on a meeting speed dial/softkey for the duration of the meeting or until the user joins. The desktop 372 may receive a pop up notification, and the mobile 376 may receive a mobile notification. Depending on which mode the user is contacted, the user may join the meeting using one touch join from the button/notification.

The techniques described herein may be implemented as method(s) that are performed by physical computing device(s), as one or more non-transitory computer-readable storage media storing instructions (e.g., stored sequences of instructions) which, when executed by computing device(s), cause performance of the method(s), or, as physical computing device(s) that are specially configured with a combination of hardware and software that causes performance of the method(s).

Figure 4:
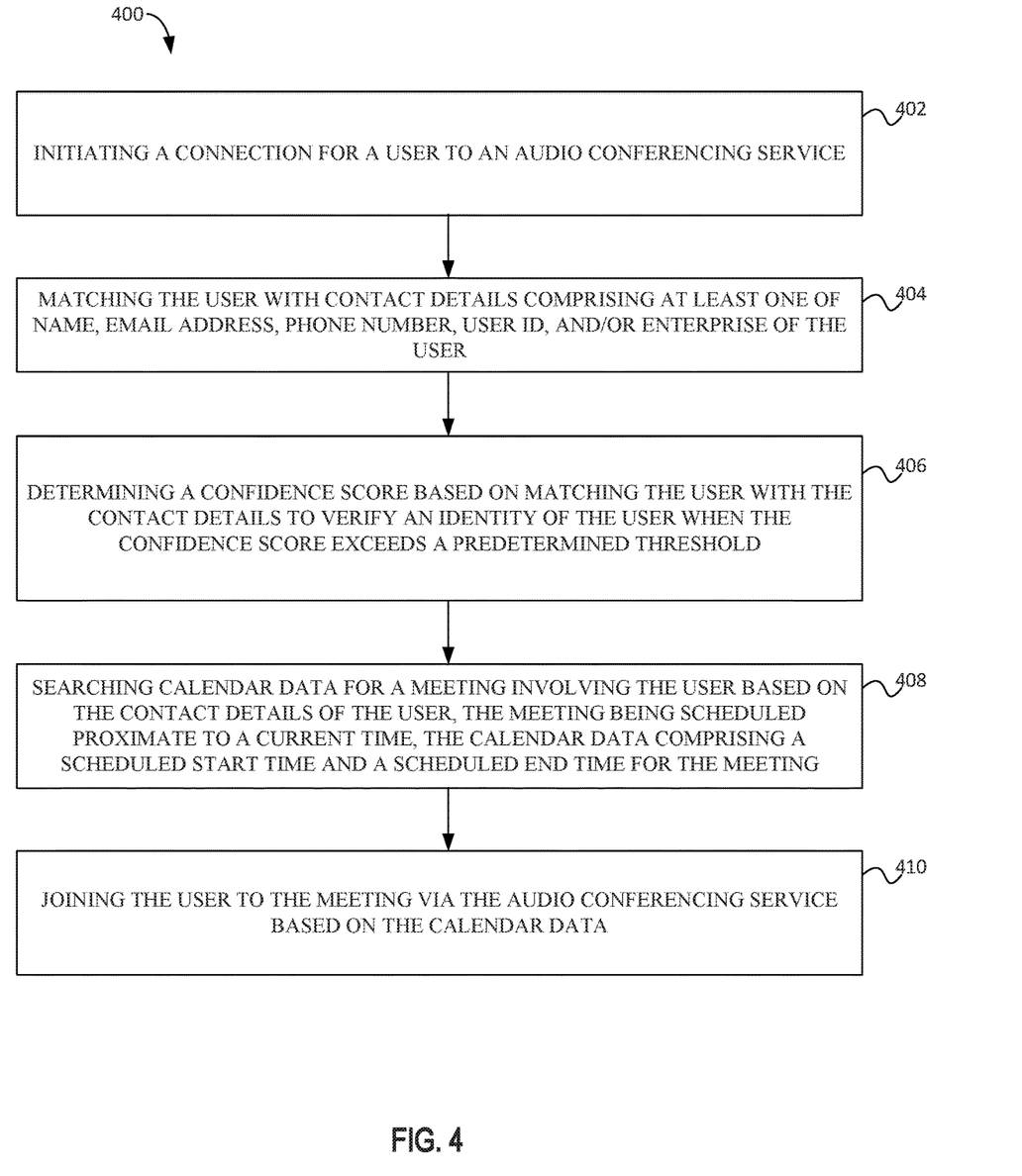
FIG. 4 illustrates an example flow diagram for intelligently joining a conference, according to certain aspects of the disclosure.

FIG. 4 illustrates an example flow diagram 400 for intelligently joining a conference, according to certain aspects of the disclosure. For explanatory purposes, the example process 400 is described herein with reference to the system 100 of FIG. 1, the system 200 of FIG. 2, and the system 300 of FIG. 3. Further for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the example process 400 will be discussed in reference to FIGS. 1, 2, and 3.

At block 402, a connection for a user to an audio conferencing service is initiated. For example, the user may call into an audio conference service using their phone. According to an aspect of the present disclosure, initiating the connection may include calling a direct inward dialing (DID) number dedicated for connecting the user to the audio conferencing service, and utilizing caller identification information of the user to match the user with the contact details.

According to an aspect of the present disclosure, initiating the connection to the audio conferencing service may include configuring a soft key dedicated for connecting the user to the audio conferencing service. Toggling the soft key may initiate a call to the audio conferencing service. The call may include user account information, and contact details of the user may be searched for based on the user account information. For example, the user may toggle a soft key on their phone that is dedicated for connecting the user to the audio conferencing service based on user account information and contact details of the user.

According to an aspect of the present disclosure, initiating the connection to the audio conferencing service may include subscribing to calendar meeting events on behalf of the user. The user may receive an indication of the meeting based on the subscribed calendar meeting events. An alert may be sent to the user regarding the meeting. For example, the alert may be sent based on state information of the user. The alert may be via a soft key on the user's phone that initiates a call to the audio conferencing service. The call may include user account information, and contact details of the user may be searched for based on the user account information.

According to an aspect of the present disclosure, sending the alert may include determining state information of the user based on at least one of a location of the user, movement of the user, recent activity of the user, and/or presence of the user on a unified communications platform (e.g., a UCaaS platform). Based on the state information, a mode and a channel may be determined for contacting the user. For example, the mode may include at least one of a mobile phone, a desktop computer, or a handset phone. The channel may depend on the mode and may include at least one of a pop-up notification, a mobile notification, a chat, a blinking light on the handset phone, or a voice call. For example, an alert may be sent to the user's computer, mobile phone, or handset depending on detected location, movement, and/or recent activity of the user.

According to an aspect of the present disclosure, determining state information of the user may include determining a status of the user (e.g., available, unavailable, do not disturb, away, busy, etc.), determining whether the user is already connected to the meeting, determining whether the user is driving, and determining whether the user is offline on a desktop computer or a mobile phone. For example, if the user is already connected to the meeting or has a status of DND, a notification will not be sent. If the user is driving or is offline, a push notification may be sent to their mobile phone. It is understood that these situations are exemplary only, and other rules may be created accordingly based on other presence states of the user.

At block 404, the user is matched with contact details comprising at least one of name, email address, phone number, user ID, and/or enterprise of the user. For example, after initiating the connection, user information may be looked up to verify an identity of the caller and to provide user information to other participants in the meeting.

At block 406, a confidence score is determined based on matching the user with the contact details to verify an identity of the user when the confidence score exceeds a predetermined threshold. For example, the confidence score may be based on how closely the contact details are matched to the user. According to an aspect, the confidence score may exceed a preconfigured threshold (e.g., at least greater than 50%).

At block 408, calendar data is searched for a meeting involving the user based on the contact details of the user. For example, the meeting may be scheduled proximate to a current time. The calendar data may include a scheduled start time and a scheduled end time for the meeting.

At block 410, the user is joined to the meeting via the audio conferencing service based on the calendar data. According to an aspect of the present disclosure, the contact details of the user may be provided to a meeting service. For example, the contact details of the user may be displayed to other participants through the meeting service.

Hardware Overview

Figure 5:
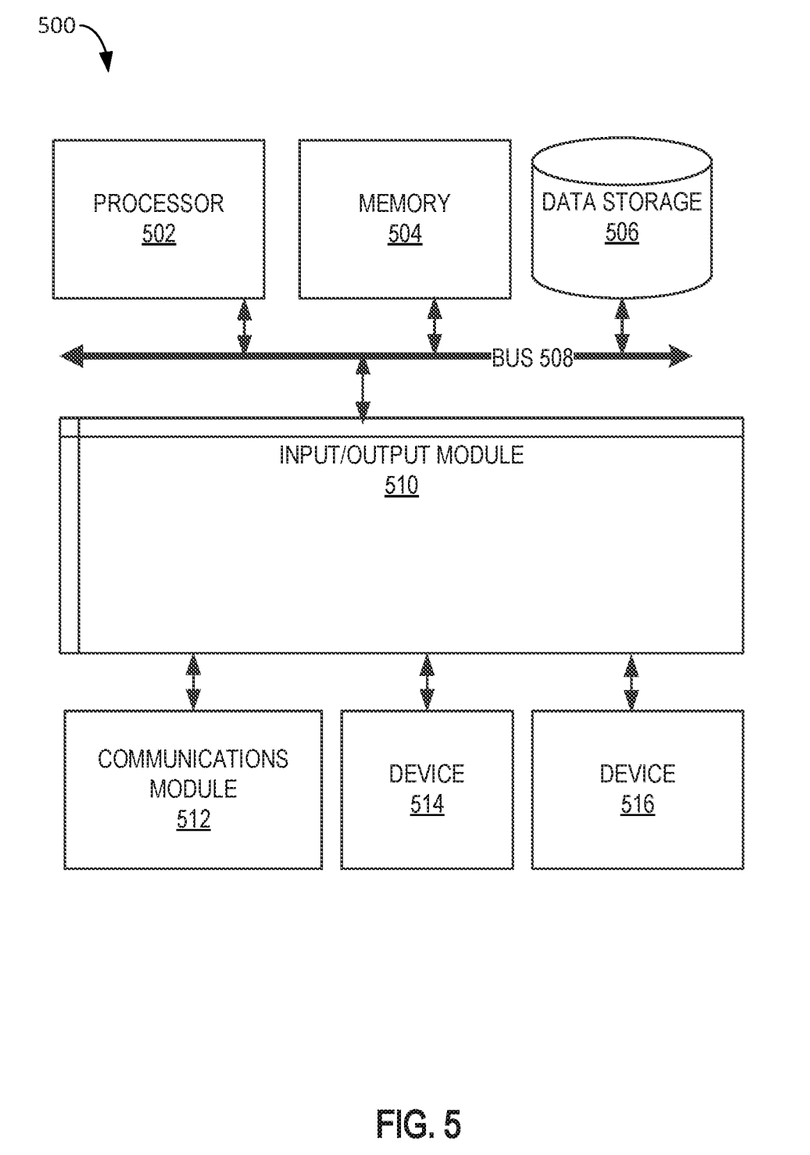
FIG. 5 is a block diagram illustrating an example computer system with which aspects of the subject technology can be implemented.

FIG. 5 is a block diagram illustrating an example computer system 500 with which the system 100 of FIG. 1, the system 200 of FIG. 2, and the system 300 of FIG. 3 may be implemented. In certain aspects, the computer system 500 may be implemented using hardware or a combination of software and hardware, either in a dedicated server, or integrated into another entity, or distributed across multiple entities.

Computer system 500 (e.g., system 100, system 200, and system 300) includes a bus 508 or other communication mechanism for communicating information, and a processor 502 coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. The processor 502 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In-Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications module 512 can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 516 may comprise appropriate circuitry for driving the output device 516 to present graphical and other information to a user.

According to one aspect of the present disclosure, the system 100, the system 200, and/or, and system 300 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 502 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for intelligently joining a conference, comprising:
   initiating a connection for a user to an audio conferencing service;
   matching the user with contact details comprising at least one of name, email address, phone number, user ID, and/or enterprise of the user;
   determining a confidence score based on matching the user with the contact details to verify an identity of the user when the confidence score exceeds a predetermined threshold;
   searching calendar data for a meeting involving the user based on the contact details of the user, the meeting being scheduled proximate to a local time of the user, the calendar data comprising a scheduled start time and a scheduled end time for the meeting; and joining the user to the meeting via the audio conferencing service based on the calendar data.

2. The computer-implemented method of claim 1, wherein initiating the connection comprises:
  calling a direct inward dialing (DID) number, the DID number dedicated for connecting the user to the audio conferencing service; and
  utilizing caller identification information of the user to match the user with the contact details.

3. The computer-implemented method of claim 1, wherein initiating the connection comprises:
  configuring a soft key dedicated for connecting the user to the audio conferencing service;
  toggling the soft key to initiate a call to the audio conferencing service, the call comprising user account information; and
  searching for the contact details of the user based on the user account information.

4. The computer-implemented method of claim 1, wherein initiating the connection comprises:
  subscribing to calendar meeting events on behalf of the user;
  receiving an indication of the meeting based on the calendar meeting events;
  sending an alert to the user of the meeting, the alert sent based on state information of the user, the alert comprising a soft key to initiate a call to the audio conferencing service, the call comprising user account information; and
  searching for the contact details of the user based on the user account information.

5. The computer-implemented method of claim 4, wherein sending the alert comprises:
  determining state information of the user based on at least one of a location of the user, movement of the user, recent activity of the user, and/or presence of the user on a unified communications platform; and
  determining a mode and a channel for contacting the user based on state information, the mode comprising at least one of a mobile phone, a desktop computer, or a handset phone, the channel depending on the mode and comprising at least one of a pop-up notification, a mobile notification, a chat, a blinking light on the handset phone, or a voice call.

6. The computer-implemented method of claim 5, wherein determining state information of the user comprises:
  determining a status of the user;
  determining whether the user is already connected to the meeting;
  determining whether the user is driving; and
  determining whether the user is offline on a desktop computer or a mobile phone.

7. The computer-implemented method of claim 1, further comprising:
  providing the contact details of the user to a meeting service, the meeting service different from the audio conferencing service; and
  displaying the contact details of the user through the meeting service.

8. A system for intelligently joining a conference, comprising:
  a memory storing sequences of instructions; and
  a processor configured to execute the sequences of instructions which, when executed, causes the processor to perform:
    initiating a connection for a user to an audio conferencing service;
    matching the user with contact details comprising at least one of name, email address, phone number, user ID, and/or enterprise of the user;
    determining a confidence score based on matching the user with the contact details to verify an identity of the user when the confidence score exceeds a predetermined threshold;
    searching calendar data for a meeting involving the user based on the contact details of the user, the meeting being scheduled proximate to a local time of the user, the calendar data comprising a scheduled start time and a scheduled end time for the meeting; and
    joining the user to the meeting via the audio conferencing service based on the calendar data.

9. The system of claim 8, wherein initiating the connection comprises:
  calling a direct inward dialing (DID) number, the DID number dedicated for connecting the user to the audio conferencing service; and
  utilizing caller identification information of the user to match the user with the contact details.

10. The system of claim 8, wherein initiating the connection comprises:
  configuring a soft key dedicated for connecting the user to the audio conferencing service;
  toggling the soft key to initiate a call to the audio conferencing service, the call comprising user account information; and
  searching for the contact details of the user based on the user account information.

11. The system of claim 8, wherein initiating the connection comprises:
  subscribing to calendar meeting events on behalf of the user;
  receiving an indication of the meeting based on the calendar meeting events;
  sending an alert to the user of the meeting, the alert sent based on state information of the user, the alert comprising a soft key to initiate a call to the audio conferencing service, the call comprising user account information; and
  searching for the contact details of the user based on the user account information.

12. The system of claim 11, wherein sending the alert comprises:
  determining state information of the user based on at least one of a location of the user, movement of the user, recent activity of the user, and/or presence of the user on a unified communications platform; and
  determining a mode and a channel for contacting the user based on state information, the mode comprising at least one of a mobile phone, a desktop computer, or a handset phone, the channel depending on the mode and comprising at least one of a pop-up notification, a mobile notification, a chat, a blinking light on the handset phone, or a voice call.

13. The system of claim 12, wherein determining state information of the user comprises:
  determining a status of the user;
  determining whether the user is already connected to the meeting;
  determining whether the user is driving; and
  determining whether the user is offline on a desktop computer or a mobile phone.

14. The system of claim 8, further comprising stored sequences of instructions, which when executed by the processor, cause the processor to perform:

providing the contact details of the user to a meeting service, the meeting service different from the audio conferencing service; and     displaying the contact details of the user through the meeting service.

15. A non-transitory computer-readable storage medium is provided including instructions that, when executed by a processor, cause the processor to perform a method for intelligently joining a conference, the method comprising:

initiating a connection for a user to an audio conferencing service;

matching the user with contact details comprising at least one of name, email address, phone number, user ID, and/or enterprise of the user;

determining a confidence score based on matching the user with the contact details to verify an identity of the user when the confidence score exceeds a predetermined threshold;

searching calendar data for a meeting involving the user based on the contact details of the user, the meeting being scheduled proximate to a local time of the user, the calendar data comprising a scheduled start time and a scheduled end time for the meeting; and     joining the user to the meeting via the audio conferencing service based on the calendar data.

16. The non-transitory computer-readable storage medium of claim 15, wherein the method further comprises:

calling a direct inward dialing (DID) number, the DID number dedicated for connecting the user to the audio conferencing service; and     utilizing caller identification information of the user to match the user with the contact details.

17. The non-transitory computer-readable storage medium of claim 15, wherein the method further comprises:

configuring a soft key dedicated for connecting the user to the audio conferencing service;

toggling the soft key to initiate a call to the audio conferencing service, the call comprising user account information; and     searching for the contact details of the user based on the user account information.

18. The non-transitory computer-readable storage medium of claim 15, wherein the method further comprises:

subscribing to calendar meeting events on behalf of the user;

receiving an indication of the meeting based on the calendar meeting events;

sending an alert to the user of the meeting, the alert sent based on state information of the user, the alert comprising a soft key to initiate a call to the audio conferencing service, the call comprising user account information; and     searching for the contact details of the user based on the user account information.

19. The non-transitory computer-readable storage medium of claim 18, wherein the method further comprises:

determining state information of the user based on at least one of a location of the user, movement of the user, recent activity of the user, and/or presence of the user on a unified communications platform; and     determining a mode and a channel for contacting the user based on state information, the mode comprising at least one of a mobile phone, a desktop computer, or a handset phone, the channel depending on the mode and comprising at least one of a pop-up notification, a mobile notification, a chat, a blinking light on the handset phone, or a voice call.

20. The non-transitory computer-readable storage medium of claim 19, wherein the method further comprises:

determining a status of the user;

determining whether the user is already connected to the meeting;

determining whether the user is driving; and determining whether the user is offline on a desktop computer or a mobile phone.

\* \* \* \* \*